United States Patent
Taya (10) Patent No.: US 11,010,882 B2
(45) Date of Patent: May 18, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Kaori Taya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 16/415,318

(22) Filed: May 17, 2019

(65) Prior Publication Data

US 2019/0378255 A1  Dec. 12, 2019

(30) Foreign Application Priority Data

Jun. 8, 2018 (JP) .............................. JP2018-110507

(51) Int. Cl.
| | |
|---|---|
| *G06K 9/00* | (2006.01) |
| *G06T 5/50* | (2006.01) |
| *G06T 7/20* | (2017.01) |
| *G06T 3/40* | (2006.01) |
| *H04N 5/243* | (2006.01) |
| *H04N 5/265* | (2006.01) |

(52) U.S. Cl.
CPC .............. *G06T 5/50* (2013.01); *G06T 3/4038* (2013.01); *G06T 7/20* (2013.01); *H04N 5/243* (2013.01); *H04N 5/265* (2013.01); *G06T 2207/20216* (2013.01); *G06T 2207/20221* (2013.01)

(58) Field of Classification Search
None
See application file for complete search history.

(56) References Cited

U.S. PATENT DOCUMENTS

| 10,419,675 B2 * | 9/2019 | Kaida ................ H04N 5/23277 |
| 2012/0008005 A1 * | 1/2012 | Fukunishi ................ G06T 5/50 |
| | | 348/222.1 |
| 2015/0116513 A1 * | 4/2015 | Chen .................... H04N 5/2352 |
| | | 348/208.1 |
| 2020/0294245 A1 * | 9/2020 | Oyaizu .............. G06K 9/00362 |

FOREIGN PATENT DOCUMENTS

JP   2015233238 A   12/2015

* cited by examiner

*Primary Examiner* — Atiba O Fitzpatrick
(74) *Attorney, Agent, or Firm* — Carter, DeLuca & Farrell LLP (57) ABSTRACT

A single composite image is generated by selecting a pixel value for each pixel in any one of a plurality of captured images having been consecutively captured. A motion vector between at least two captured images among the plurality of captured images is calculated. Correction processing is performed, based on a motion vector corresponding to a pixel of interest in the composite image, on the pixel of interest or a pixel near the pixel of interest. The correction processing is performed by updating, using a bright pixel value, a pixel value of at least one pixel in a group of pixels associated with a path from the pixel of interest to a pixel indicated by the motion vector corresponding to the pixel of interest.

20 Claims, 11 Drawing Sheets

FIG. 5C  POST-CORRECTION COMPOSITE IMAGE

FIG. 5B  COMPOSITE IMAGE

FIG. 5A  COMPOSITE MOVING OBJECT MAP

FIG. 6C

POST-CORRECTION COMPOSITE IMAGE

FIG. 6B

COMPOSITE IMAGE

FIG. 6A

FRONT COMPOSITE MOVING OBJECT MAP

REAR COMPOSITE MOVING OBJECT MAP

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to techniques for generating a single image from a plurality of images.

Description of the Related Art

In recent years, a technique has been developed in which images obtained by continuous shooting or images of respective frames of a moving picture are aligned to perform composition. This technique is, for example, a technique in which a single image is created by performing lighten composite on a plurality of images obtained by continuously shooting trajectories of moving stars in a starry sky, an image like a follow shot is created by adding images of a plurality of frames of a moving picture, or the like.

Japanese Patent Laid-Open No. 2015-233238 discloses a technique for reducing discontinuation in a bright light trajectory generated when lighten composite is performed on a plurality of images. According to this technique, by performing lighten composite on images in which a plurality of images are added and averaged to create an overlapping portion of a light trace, discontinuation caused by the lighten composite can be reduced.

However, in the technique described in Japanese Patent Laid-Open No. 2015-233238, there is an issue that the trajectory of a moving object is discontinued when composition is performed on a plurality of images, because there exists a non-exposure period between the frames.

SUMMARY OF THE INVENTION

The present invention provides a technique for generating a single image from a plurality of images without causing a trajectory of a moving object to be discontinued.

According to the first aspect of the present invention, there is provided an image processing apparatus, comprising: a generating unit configured to generate a single composite image by selecting a pixel value for each pixel in any one of a plurality of captured images having been consecutively captured; a calculating unit configured to calculate a motion vector between at least two captured images among the plurality of captured images; and a correcting unit configured to perform correction processing, based on a motion vector corresponding to a pixel of interest in the composite image, on the pixel of interest or a pixel near the pixel of interest, wherein the correcting unit performs the correction processing by updating, using a bright pixel value, a pixel value of at least one pixel in a group of pixels associated with a path from the pixel of interest to a pixel indicated by the motion vector corresponding to the pixel of interest.

According to the second aspect of the present invention, there is provided an image processing method performed by an image processing apparatus, the method comprising: generating a single composite image by selecting a pixel value for each pixel in any one of a plurality of captured images having been consecutively captured; calculating a motion vector between at least two captured images among the plurality of captured images; and performing correction processing, based on a motion vector corresponding to a pixel of interest in the composite image, on the pixel of interest or a pixel near the pixel of interest, wherein the correction processing is performed by updating, using a bright pixel value, a pixel value of at least one pixel in a group of pixels associated with a path from the pixel of interest to a pixel indicated by the motion vector corresponding to the pixel of interest.

According to the third aspect of the present invention, there is provided a non-transitory computer-readable storage medium storing a computer program for causing a computer to function as: a generating unit configured to generate a single composite image by selecting a pixel value for each pixel in any one of a plurality of captured images having been consecutively captured; a calculating unit configured to calculate a motion vector between at least two captured images among the plurality of captured images; and a correcting unit configured to perform correction processing, based on a motion vector corresponding to a pixel of interest in the composite image, on the pixel of interest or a pixel near the pixel of interest, wherein the correcting unit performs the correction processing by updating, using a bright pixel value, a pixel value of at least one pixel in a group of pixels associated with a path from the pixel of interest to a pixel indicated by the motion vector corresponding to the pixel of interest.

Further features of the present invention will become apparent from the following description of exemplary embodiments (with reference to the attached drawings).

DESCRIPTION OF THE EMBODIMENTS

Embodiments of the invention will be described below with reference to the accompanying drawings. Note that each of the embodiments described below illustrates an example of a specific implementation of the present invention and is one specific embodiment of the configurations described in the scope of the claims.

First Embodiment

In the present embodiment, a single image is generated as a composite image from a plurality of captured images obtained by image-capturing a photographic subject (object) (a plurality of captured images experience composition processing to generate a single composite image). The captured image of the photographic subject may be an image of each frame constituting a moving picture of the photographic subject or may be an image of each frame obtained by continuously shooting the photographic subject. Here, even in the case where the captured image of the photographic subject is an image of each frame constituting a moving picture of the photographic subject; or an image of each frame obtained by the photographic subject being continuously shot, there is a non-exposure period between the frames. Because of this, when composition processing is performed on such a plurality of captured images, discontinuation is visually recognized in a seam. In the present embodiment, the generated composite image is corrected to reduce such discontinuation.

In the following, it is assumed that any of the handled images is an image in which the color components of a pixel value of each pixel are RGB (an image in which the pixel value of each pixel includes a pixel value of an R component, a pixel value of a G component and a pixel value of a B component). However, the color components of the pixel value of each pixel of the images handled below are not limited to RGB and may be color components of other types (for example, YUV, XYZ, or Lab).

Figure 2:
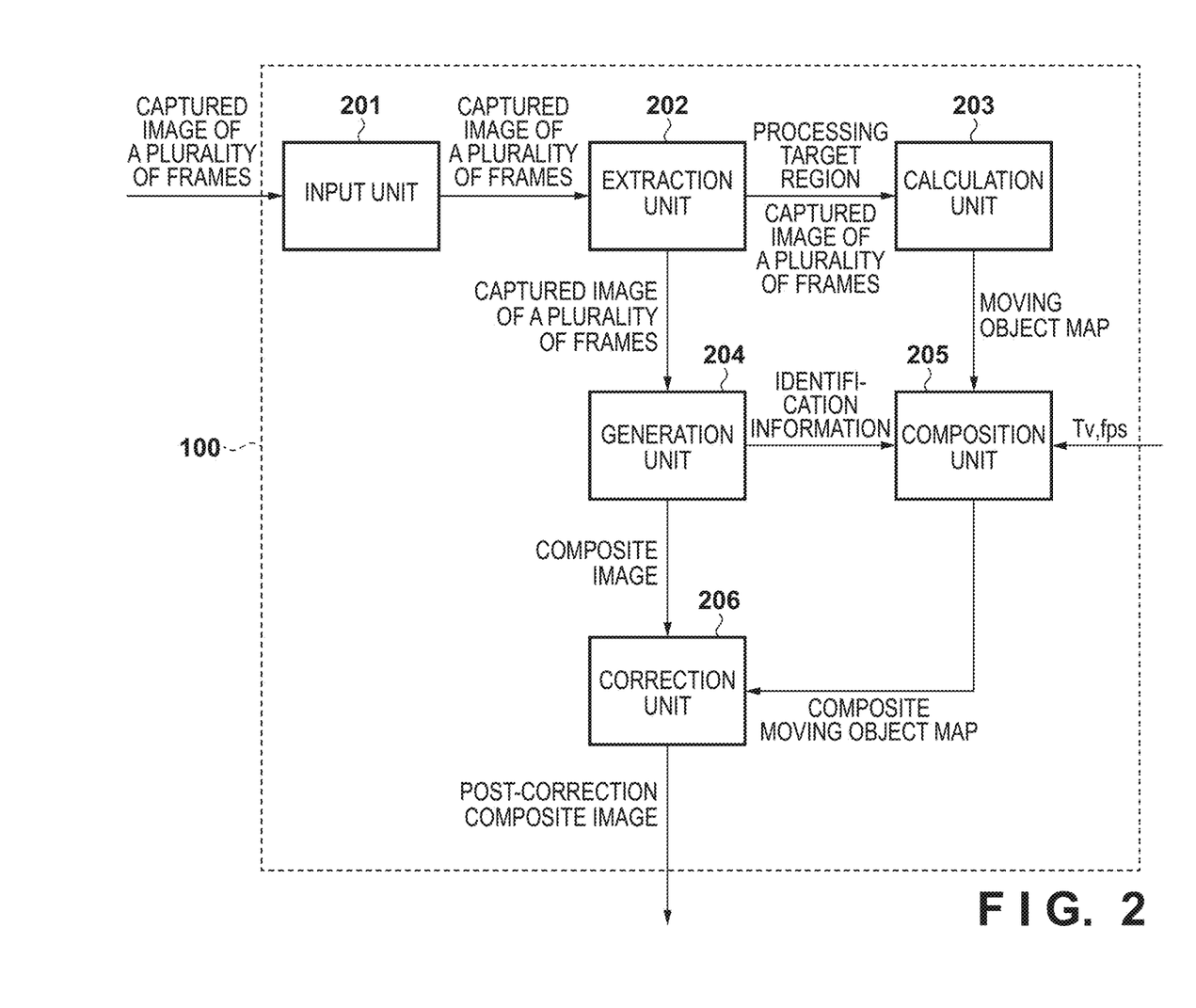
FIG. 2 is a block diagram illustrating an example of a functional configuration of an image processing apparatus.
Figure 3:
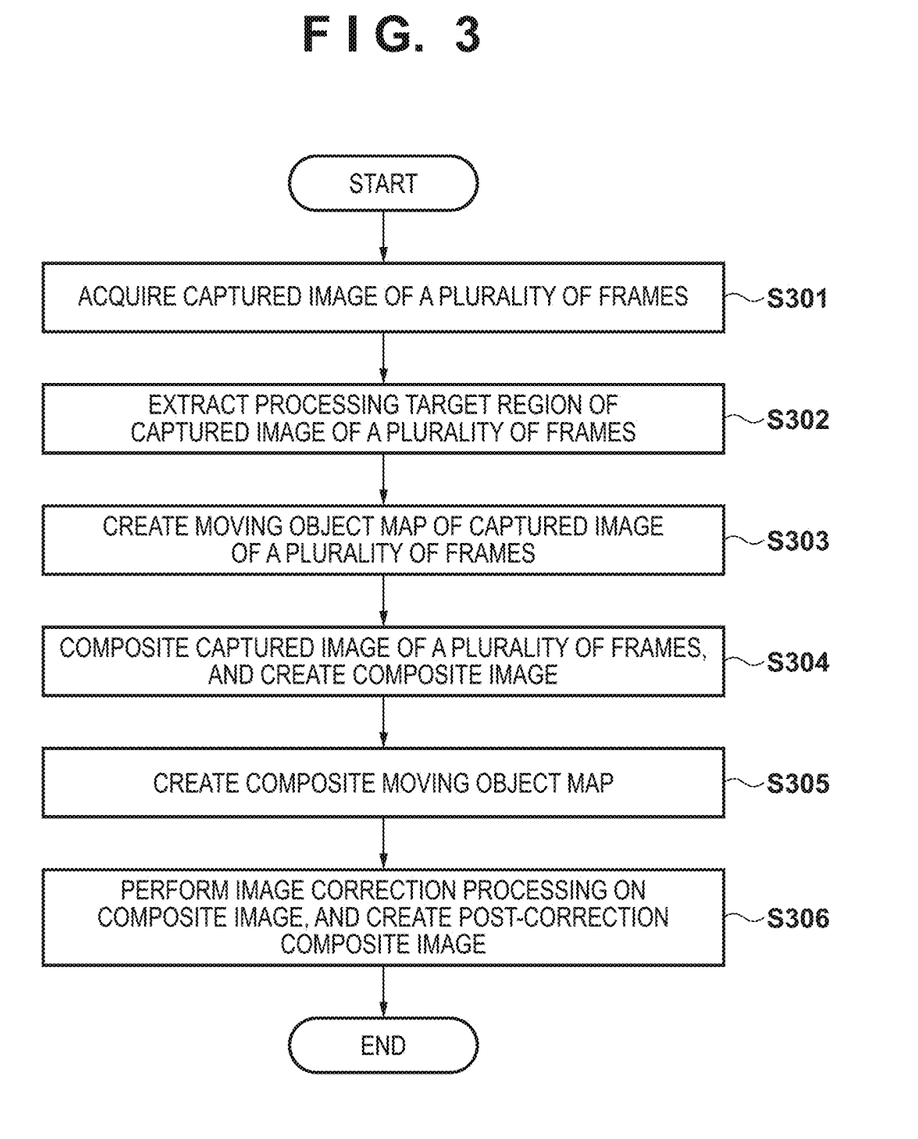
FIG. 3 is a flowchart of a process performed by an image processing apparatus 100.

An example of a functional configuration of an image processing apparatus according to the present embodiment is illustrated in FIG. 2. A process in which an image processing apparatus 100 having the functional configuration illustrated in FIG. 2 performs to generate a single composite image from a plurality of captured images will be described in accordance with a flowchart in FIG. 3.

In step S301, an input unit 201 acquires a plurality of captured images obtained by capturing the same photographic subject. The acquisition source of the plurality of captured images is not limited to any specific acquisition source. For example, the input unit 201 may acquire a captured image of each frame outputted from an image capturing device capturing a moving picture of the same photographic subject or continuously shooting the same photographic subject. Alternatively, the input unit 201 may acquire a captured image of each frame, having been previously stored in a memory device installed inside or outside of the image processing apparatus 100, from the memory device. Note that, in each captured image, identification information specific to the captured image is attached; however, the identification information of the captured image is not limited to being attached to the captured image, and any identification information may be used as long as it is associated with the captured image.

Figure 4A:
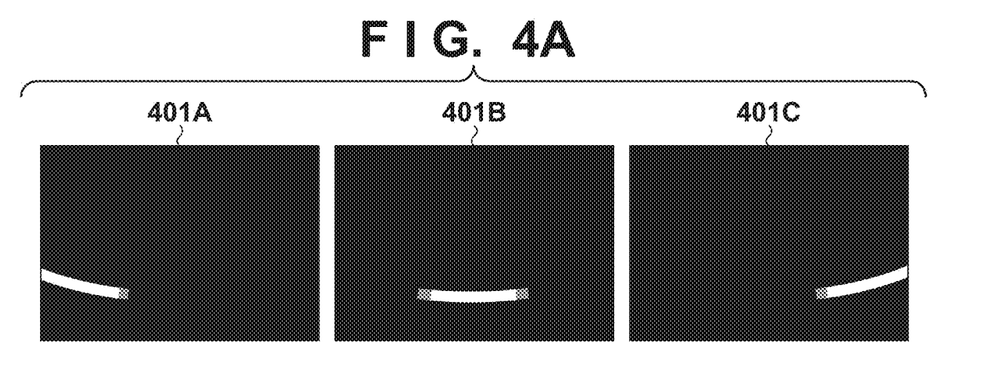
FIGS. 4A to 4C are diagrams illustrating an example of a captured image, a moving object map, a composite image, a composite moving object map, and a post-correction composite image.

An example of the captured images acquired in step S301 is illustrated in FIG. 4A. Captured images 401A, 401B and 401C illustrated in FIG. 4A are an example of consecutive three-frame captured images acquired in step S301 and are consecutive three-frame captured images obtained by image-capturing a photographic subject in such a case where a light source moves in the dark.

In step S302, an extraction unit 202 extracts an image region to be processed (a processing target region) from each captured image having been acquired in step S301. The processing target region is determined depending on contents of image composition to be described later.

For example, in the present embodiment, as image composition to be described later, composition (lighten composite) is performed in which a pixel having the maximum luminance value among the pixels at a pixel of interest position (x, y) of a plurality of captured images is selected as a pixel at the pixel of interest position (x, y) of a composite image. By lighten composite, an image can be composed in which the composite image looks like an image resulting from a long exposure. However, as described above, because there is a non-exposure time between the plurality of captured images, discontinuation is generated in a line segment that would be a beam of light in the case of a long exposure. In the case of lighten composite, in step S302, the extraction unit 202 extracts, from each of the captured images acquired in step S301, a region configured by a pixel having a luminance value equal to or greater than a threshold value in the captured image as a processing target region.

Further, for example, as image composition to be described later, composition (darken composite) may also be performed in which a pixel having the minimum luminance value among the pixels at a pixel of interest position (x, y) of a plurality of captured images is selected as a pixel at the pixel of interest position (x, y) of a composite image. In this case, a bright object that moves during the plurality of captured images being image-captured does not remain in the composite image. In this case, in step S302, the extraction unit 202 extracts, from each of the captured images acquired in step S301, a region configured by a pixel having a luminance value smaller than a threshold value in the captured image as a processing target region.

Since the purpose of the processing in step S302 is to specify a processing target region in the captured image, the purpose may be achieved by other processes as long as the same purpose can be achieved. For example, the extraction unit 202 may generate a binary image for holding a mask value for each pixel by assigning a mask value "1" to a pixel constituting a processing target region and a mask value "0" to a pixel not constituting a processing target region in the captured image.

Furthermore, the processing target region in the captured image is not limited to be a partial region of the captured image and may be an entire region of the captured image, and in this case, the processing in step S302 can be omitted.

In step S303, a calculation unit 203 generates a moving object map for holding, for each pixel, a motion vector of the processing target region between adjacent frames in the captured image of each frame having been acquired in step S301. For example, the calculation unit 203 generates, as a "moving object map for a captured image A", a moving object map that holds, for each pixel, a motion vector of the processing target region between the captured image of a frame A (captured image A) and the captured image of a frame B (captured image B) adjacent to the frame A (any one of the front-side or rear-side frames adjacent to the frame A).

For example, in a case where a pixel on a pixel position (x, y) in the captured image A is a pixel constituting the processing target region, and the pixel is also a pixel having moved from a pixel position (x', y') in the captured image B of the frame B immediately before the frame A, a relation of (Vx, Vy)=(x−x', y−y') is registered on the position (x, y) in the moving object map of the captured image A. Further, for example, in a case where a pixel on a pixel position (x, y) in the captured image A is a pixel constituting the processing target region, and the pixel has moved to a pixel position (x', y') in the captured image B of the frame B immediately after the frame A, a relation of (Vx, Vy)=(x'−x, y'−y) is registered on the position (x, y) in the moving object map of the captured image A. In a case where a pixel on a pixel position (x, y) in the captured image A is not a pixel constituting the processing target region, a value of (Vx, Vy)=(0, 0) or the like is registered on the position (x, y) in the moving object map of the captured image A.

Figure 4B:
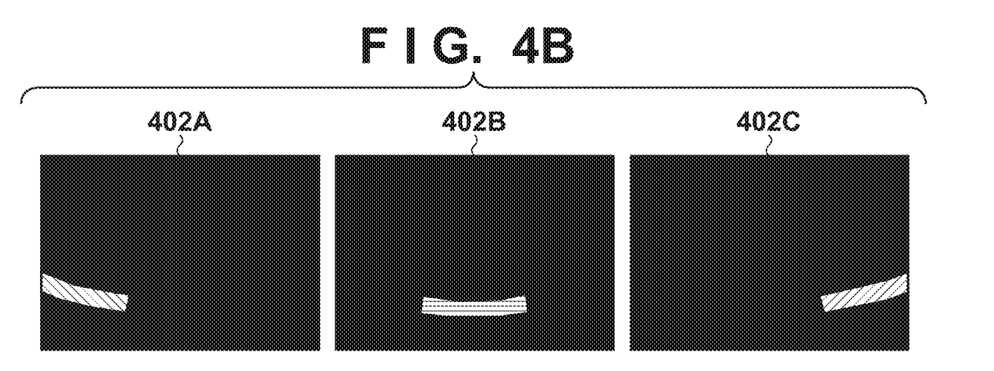

An example of moving object maps corresponding to the captured images in FIG. 4A is illustrated in FIG. 4B. Each of moving object maps 402A, 402B, and 402C in FIG. 4B is a moving object map example corresponding to each of the captured images 401A, 401B, and 401C in FIG. 4A.

Here, in order to effectively fill the non-exposure period, the calculation unit 203 may register (Vx', Vy') indicated by the following formula on a position (x, y) in the moving object map instead of (Vx, Vy).

$$(V'x, V'y)=((1-Tv \times fps) \times Vx, (1-Tv \times fps) \times Vy)$$

Here, Tv is an exposure time [sec] when image-capturing a plurality of captured images, and fps is a frame rate of a plurality of captured images (an acquisition frequency: the inverse of a time difference between captured images) [fps, frame/sec]. For example, in a case where the exposure time Tv is 1/60 [sec], and the frame rate fps is 30 [fps], (Vx', Vy') is obtained by the following formula.

$$(V'x, V'y)=((1-30/60) \times Vx, (1-30/60) \times Vy)=(0.5 \times Vx, 0.5 \times Vy)$$

That is, (Vx', Vy') is obtained by modifying (Vx, Vy) based on the exposure time and the frame rate. In the following, in any of the cases in which (Vx, Vy) is registered on the position (x, y) in the moving object map and in which (Vx', Vy') is registered on the position (x, y) in the moving object map, they are expressed as (Vx, Vy).

Figure 4C:
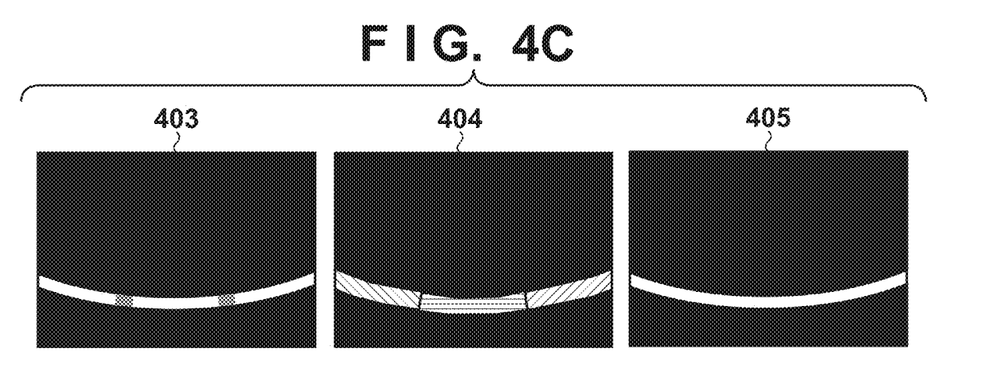

In step S304, a generation unit 204 generates one composite image using the pixels selected from the plurality of captured images having been acquired in step S301 (image composition). As described above, lighten composite, darken composite, and the like are available for image composition, and the lighten composite is used here. Note that, 403 in FIG. 4C is an example of a composite image obtained by performing the lighten composite using the captured images 401A, 401B, and 401C in FIG. 4A. A composite image 403 includes a "region of pixels selected from the processing target region of the captured image 401A" (region A), a "region of pixels selected from the processing target region of the captured image 401B" (region B), and a "region of pixels selected from the processing target region of the captured image 401C" (region C). The generation unit 204 associates each pixel of the composite image with identification information of the captured image from which the pixel is selected.

In step S305, a composition unit 205 generates, as a composite moving object map, a moving object map corresponding to the composite image from the moving object map of the captured image corresponding to the identification information associated with each of the pixels constituting the composite image. For example, the composition unit 205 registers, on a position (s, t) in the composite moving object map, an element (Vs, Vt) at a position (s, t) in the moving object map of the captured image corresponding to the identification information associated with a pixel at a pixel position (s, t) in the composite image.

A composite moving object map 404 in FIG. 4C is an example of a composite moving object map corresponding to the composite image 403. The composite moving object map 404 includes a portion corresponding to the region A (hatched portion) in the moving object map 402A, a portion corresponding to the region B (hatched portion) in the moving object map 402B, and a portion corresponding to the region C (hatched portion) in the moving object map 402C.

In step S306, a correction unit 206 performs image correction processing on the composite image generated in step S304 using the composite moving object map generated in step S305 so as to generate a post-correction composite image in which the above composite image is corrected. There are various kinds of processes for image correction processing using the composite moving object map generated in step S305, and several examples thereof will be described below.

Image Correction Processing Using Moving Object Map of Single Direction (Form 1)

Figures 5A, 5B, 5C:
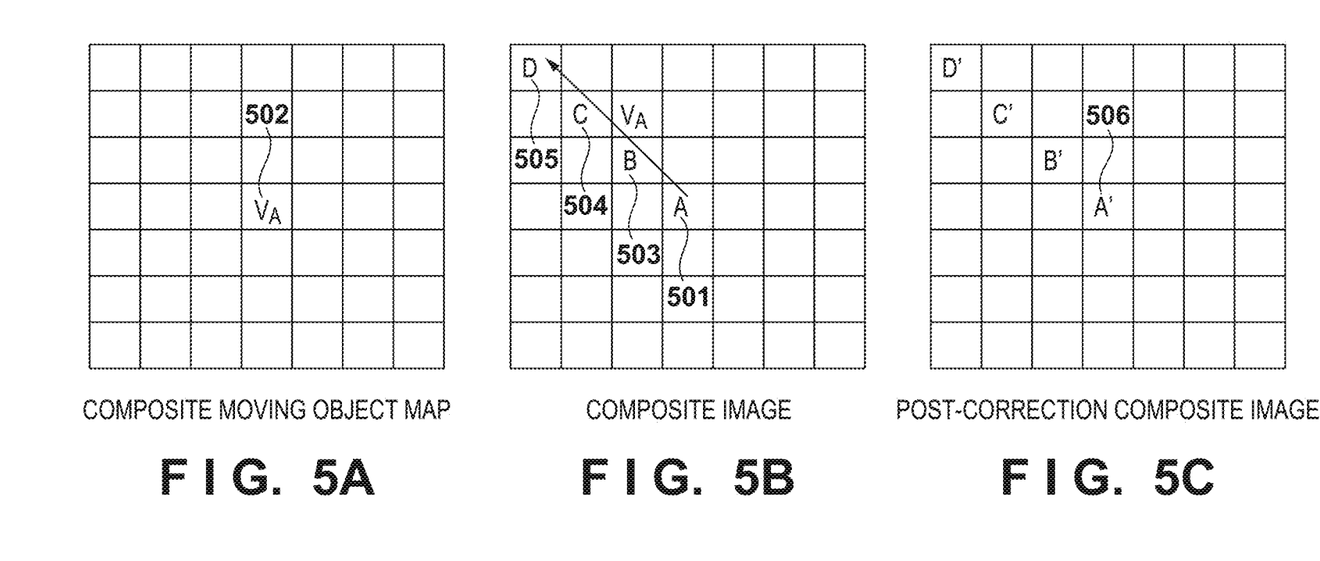
FIGS. 5A to 5C are diagrams for explaining form 1 and form 2.

FIG. 5B illustrates a composite image; hereinafter, a pixel 501 in the composite image (the pixel position is (xA, yA)) is taken as a processing target pixel, and the image correction processing performed on the processing target pixel will be described. FIG. 5A represents a composite moving object map corresponding to the composite image illustrated in FIG. 5B, where a motion vector VA (Vx, Vy) is registered as an element 502 at the position (xA, yA) in the composite moving object map. Here, for the purpose of citing and describing a specific example, (Vx, Vy) is set to be (-3, 3).

In this case, the correction unit 206 first specifies a pixel at a pixel position (x, y), which is expressed by a formula of (x, y)=(xA+α, yA+Round (α×Vy/Vx)), in the composite image (when |Vx|≥|Vy|). Here, α is an integer having the same sign as that of Vx and satisfying a relation of 0≤|α|≤|Vx|, and Round (x) represents an integer closest to x. In other words, the correction unit 206 specifies a plurality of pixels on a path, from the processing target pixel to the pixel indicated by the motion vector corresponding to the processing target pixel. In the case of FIG. 5B, specified are pixels (the pixel 501, a pixel 503, a pixel 504, and a pixel 505) through which a line segment passes, the line segment connecting a position, separate from a pixel position of the pixel 501 by the magnitude of the motion vector VA in a direction of the motion vector VA, with the pixel position of the pixel 501. In FIG. 5B, A, B, C, and D are pixel values of the pixel 501, the pixel 503, the pixel 504, and the pixel 505, respectively.

In a case of |Vx|<|Vy|, the correction unit 206 specifies a pixel at a pixel position (x, y), which is expressed by a formula of (x, y)=(xA+Round (β×Vx/Vy), yA+β), in the composite image. Here, β is an integer having the same sign as that of Vy and satisfying a relation of 0≤|β|≤|Vy|.

Then, the correction unit 206 updates the pixel value A of the pixel 501 to a value of A' that satisfies a relation of A'=Max (A, B, C, D). Hereinafter, Max( ) is a function that returns a maximum value among the elements within the parentheses. With this, in a case where the processing target pixel is on a movement path of a bright object, the correction unit 206 corrects the processing target pixel in such a manner as to cause a bright light beam to be continuous.

The correction unit 206 corrects the composite image by performing such image correction processing on each pixel constituting the composite image. FIG. 5C illustrates a result of the pixel values A, B, C, and D being updated to the pixel values A', B', C', and D' respectively, as a result of the image correction processing having been performed on each of the pixels 501, 503, 504, and 505 in FIG. 5B. By performing the (form 1) image correction processing on the composite image 403 in FIG. 4C, obtained is a "post-correction composite image 405 in which a once-discontinued light trace is continuously connected" as illustrated in FIG. 4C.

Image Correction Processing Using Moving Object Map of Single Direction (Form 2)

Although the image correction processing of form 1 updates the pixel value of a processing target pixel based on the pixel value of a pixel on the motion vector, image correction processing of form 2 updates the pixel value of a pixel (excluding a processing target pixel) on the motion vector based on the pixel value of the processing target pixel.

For example, in the example of FIGS. 5B and 5C, a relation of B'=Max (A, B), a relation of C'=Max (A, C), and a relation of D'=Max (A, D) are given. This processing allows a discontinued portion of a light beam to be connected even when the non-exposure period is largely lengthened.

Image Correction Processing Using Moving Object Map of Two-Way Direction (Form 3)

In the example described above, the calculation unit 203 generates, as a moving object map for the captured image (captured image A) of the frame A, a moving object map between the captured image A and the captured image of any one of the front-side or rear-side frames adjacent to the frame A. However, the calculation unit 203 may generate, as moving object maps for the captured image A, two moving object maps, that is, a moving object map between the captured image A and the captured image of the front-side frame adjacent to the frame A, and a moving object map between the captured image A and the captured image of the rear-side frame adjacent to the frame A. Hereinafter, the "moving object map between the captured image A and the captured image of the front-side frame adjacent to the frame A" is referred to as a front moving object map, and the "moving object map between the captured image A and the captured image of the rear-side frame adjacent to the frame A" is referred to as a rear moving object map. A method for generating the front and rear moving object maps is as described in the first embodiment.

Then, the composition unit 205 generates a front composite moving object map by performing composition processing on the front moving object map for each captured image; and a rear composite moving object map by performing composition processing on the rear moving object map for each captured image, with a similar method to the method for the generation of the above composite moving object map.

By the image correction processing of the composite image being performed using the front composite moving object map and the rear composite moving object map, the trajectory of a curved light beam, for example, like a circular motion can also be more naturally corrected. Image correction processing of a composite image performed by the correction unit 206 using a front composite moving object map and a rear composite moving object map will be described by exemplifying FIGS. 6A to 6C.

Figure 6A:
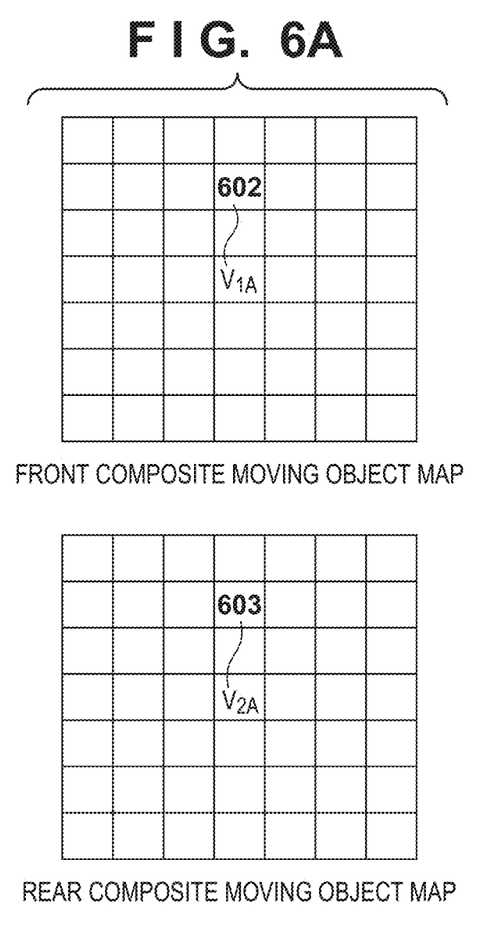
FIGS. 6A to 6C are diagrams for explaining form 3.
Figure 6B:
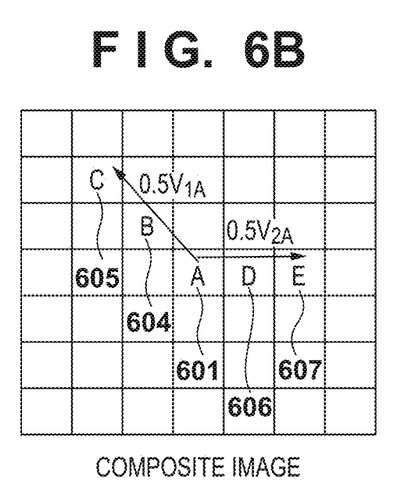

FIG. 6B illustrates a composite image, in which a pixel 601 (the pixel value is A, the pixel position is (xA, yA)) is taken as a processing target pixel. As illustrated in FIG. 6B, the pixel value of a pixel 604 is B, the pixel value of a pixel 605 is C, the pixel value of a pixel 606 is D, and the pixel value of a pixel 607 is E.

At an upper side of FIG. 6A, there is illustrated a front composite moving object map of the composite image in FIG. 6B, where a motion vector V1A of the pixel 501 (from the front-side frame) is registered as an element 602 on a position (xA, yA) in the front composite moving object map. At a lower side of FIG. 6A, there is illustrated a rear composite moving object map of the composite image in FIG. 6B, where a motion vector V2A of the pixel 501 (to the rear-side frame) is registered as an element 603 on a position (xA, yA) in the rear composite moving object map. In the following, a relation of V1A=(Vx, Vy)=(−4, 4) and a relation of V2A=(Vx, Vy)=(4, 0) are assumed in order to give a specific description.

In this case, since it is sufficient to process half of the motion vector in a front direction and a rear direction, a relation of 0.5×V1A=(Vx, Vy)=(−2, 2) and a relation of 0.5×V2A=(Vx, Vy)=(2, 0) are assumed while the size of each of V1A and V2A being halved. Then, using the relation of 0.5×V1A=(Vx, Vy)=(−2, 2), the pixel position (x, y) in the composite image is specified (xA+α, yA+Round (α×Vy/Vx)) (in a case where |Vx|<|Vy|, a pixel is at (xA+Round (β×Vx/Vy), yA+β)). Likewise, using the relation of 0.5×V2A=(Vx, Vy)=(2, 0), the pixel position (x, y) in the composite image is specified (xA+α, yA+Round (α×Vy/Vx)) (in a case where |Vx|<|Vy|, a pixel is at (xA+Round (β×Vx/Vy), yA+β)). As a result, as illustrated in FIG. 6B, the pixels (pixels 604, 605) on the motion vector (0.5×V1A), and the pixels (pixels 606, 607) on the motion vector (0.5×V2A) may be specified. Then, in the present embodiment in which image composition is achieved by lighten composite, the pixel value A of the pixel 601 is updated to A' that satisfies a relation of A'=Max (A, B, C, D, E).

Figure 6C:
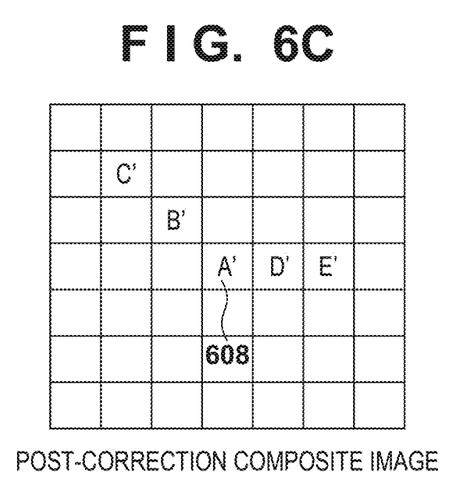

By performing such image correction processing on each pixel constituting a composite image, the correction unit 206 corrects the composition image. FIG. 6C illustrates a result of the pixel values A, B, C, D, and E being updated to the pixel values A', B', C', D', and E', respectively, as a result of the image correction processing being performed on each of the pixels 601, 604, 605, 606, and 607 in FIG. 6B. By performing the (form 3) image correction processing on the composite image 403 in FIG. 4C, the "post-correction composite image 405 in which a once-discontinued light trace is continuously connected" as illustrated in FIG. 4C is obtained. According to form 3, in a case of the movement of a light trace not exhibiting a uniform linear motion but exhibiting an accelerated motion, there is an effect of making the seams less noticeable as compared with the case of the single direction processing.

Image Correction Processing Using Moving Object Map of Two-Way Direction (Form 4)

Although the image correction processing of form 3 updates the pixel value of a processing target pixel based on the pixel value of a pixel on the motion vector, image correction processing of form 4 updates the pixel value of a pixel (excluding a processing target pixel) on the motion vector based on the pixel value of the processing target pixel.

For example, in the example of FIGS. 6B and 6C, a relation of B'=Max (A, B), a relation of C'=Max (A, C), a relation of D'=Max (A, D), and a relation of E'=Max (A, E) are given. This processing allows a discontinued portion to be connected even when the non-exposure period is largely lengthened.

Image Correction Processing in Consideration of Pixel Position of Decimal Fraction Precision (Form 5)

In the above examples, pixels through which a line segment based on a motion vector passes are specified in a composite image. However, there is a case in which the line segment passes through the vicinity of the center position of a pixel, or there is a case in which the line segment passes through part of a pixel; further, in the case of a pixel at which an end portion of the line segment is located, the line segment passes through only part of the pixel.

Therefore, in the present embodiment, when the correction unit 206 specifies a pixel through which a line segment based on a motion vector passes in a composite image, the correction unit 206 first specifies a pixel at a pixel position (x, y) in the composite image obtained according to the following formula (in the case of |Vx|≥|Vy|).

$(x, y) = (xA+\alpha, yA+\text{Floor}(\alpha Vy/Vx))$ or $(x, y) = (xA+\alpha, yA+\text{Ceil}(\alpha Vy/Vx))$ In the case of |Vx|<|Vy|, the correction unit 206 specifies a pixel at a pixel position (x, y) in the composite image obtained according to the following formula.

$(x, y) = (xA+\text{Floor}(\beta Vx/Vy), yA+\beta)$ or $(x, y) = (xA+\text{Ceil}(\beta Vx/Vy), yA+\beta)$ Then, the correction unit 206 performs weighting on a pixel value of each specified pixel in accordance with a distance between the pixel and the line segment and determines the pixel value of a processing target pixel based on the weighted pixel value. The image correction processing in the present form will be described with reference to a specific example illustrated in FIGS. 7A to 7C.

Figure 7A:
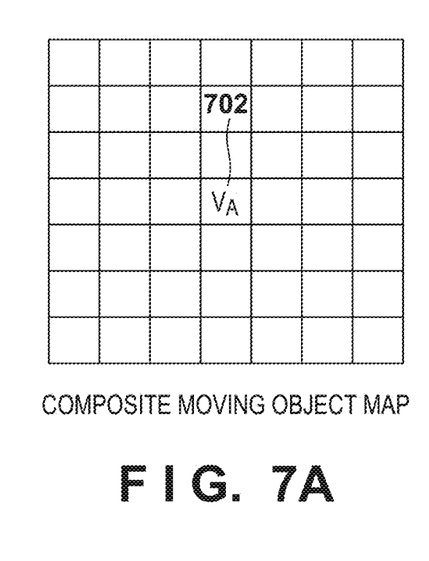
FIGS. 7A to 7C are diagrams for explaining form 5.
Figure 7B:
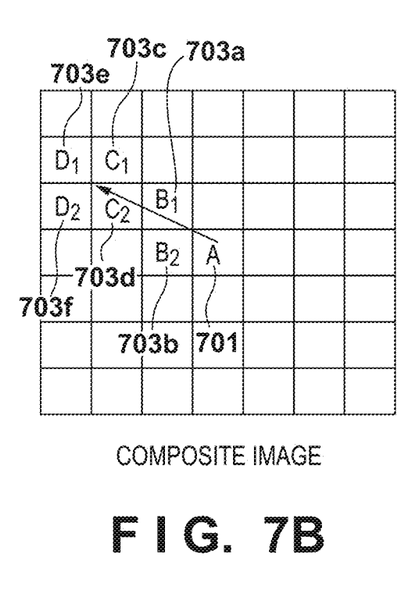

FIG. 7B illustrates a composite image, and hereinafter, a pixel 701 (the pixel position is (xA, yA)) in the composite image is taken as a processing target pixel, and the image correction processing performed on the processing target pixel will be described. FIG. 7A represents a composite moving object map corresponding to the composite image illustrated in FIG. 7B, where a motion vector VA (Vx, Vy) is registered as an element 702 at the position (xA, yA) in the composite moving object map. Here, for the purpose of citing and describing a specific example, (Vx, Vy) is set to be (−2.5, 1.5). The correction unit 206 performs pixel specifying processing according to the above formula so as to specify pixels 703a to 703f (pixel values are B1, B2, C1, C2, D1, and D2, respectively).

Figure 7C:
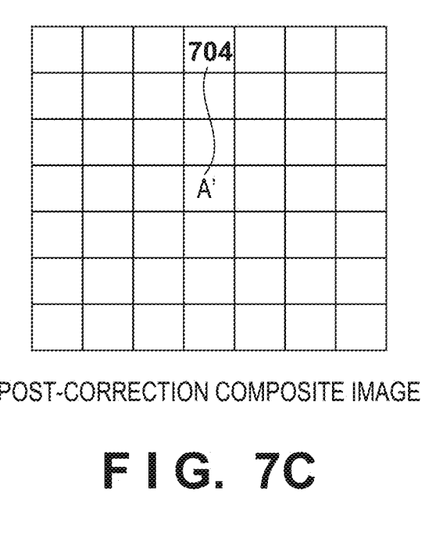

Then, the correction unit 206 updates a pixel value A of the pixel 701 to a pixel value A' that satisfies a relation of A'=Max (b×B1+(1−b)×B2, c×C1+(1−c)×C2, α×(d×D1+(1−d)×D2)) in the case where the image composition in step S305 is lighten composite.

Here, b, c, and d are respectively weight values for the pixel values; in the case of FIGS. 7A to 7C, as a distance in a longitudinal direction between the pixel and the line segment is smaller, the weight values become larger, and as the distance in the longitudinal direction between the pixel and the line segment is larger, the weight values become smaller. In the case of FIGS. 7A to 7C, b is 0.6, c is 0.2, d is 0.8, and α is equal to a value of (|−2.5|−|−2.0|=0.5). Here, as for D1 and D2, since the length of the line segment passing through is equal to or smaller than 1, D1 and D2 are multiplied by a weight α. With the above-discussed settings, indentations can be reduced when diagonal light-trace correction processing is performed. Note that the method for calculating a weight value according to the distance from the pixel to the line segment is not limited to any specific calculation direction.

Case of Combination with Image Stabilization

In a case where electronic image stabilization processing is performed on an image, the image after the electronic image stabilization may be processed as input. In addition, in the case where the image stabilization is performed using the result of the calculation unit 203, the generation unit 204 may composite an image after the electronic image stabilization based on the moving object map, and the moving object map may be converted in which the amount of image stabilization is deducted so that the moving object map comes to be a moving object map between the images after the image stabilization.

The present embodiment has mainly cited and described an example of lighten composite, and this composition processing can also be applied to darken composite by changing the Max to Min. Alternatively, the processing may be applied to processing configured to select one of the pixel values within a range, such as Median in place of the Max.

Further, the output destination of a post-correction composite image by the correction unit 206 is not limited to any specific output destination; for example, an internal or external memory of the image processing apparatus may be used as an output destination, a display device or a projection device may be used as an output destination, or a device having a printing function may be used as an output destination.

Although, in the present embodiment, several forms have been described as image correction processing using a composite moving object map generated in step S305, these forms are exemplary and may be varied or modified as appropriate. Furthermore, some or all of these forms may be combined as appropriate or may be used selectively.

Second Embodiment

In the following, a difference from the first embodiment will be described, and in other points, the present embodiment is considered to be the same as the first embodiment unless specifically stated below. In the present embodiment, transparency is adjusted by using a post-correction composite image generated by the processing according to the first embodiment.

In the case where the first embodiment described above is used in lighten composite of a night view image, a discontinued trajectory of a moving object can be connected. However, in reality, when a long time exposure is performed at the same scene, a background image behind the trajectory of the moving object is seen in a semi-transparent manner through the trajectory of the moving object, whereas in a post-correction composite image generated in the first embodiment, the trajectory portion is opaque. Then, in the present embodiment, by α-blending an average image of a plurality of captured images and a post-correction composite image, it is possible to adjust transparency of the trajectory of a moving object in the post-correction composite image.

Figure 8:
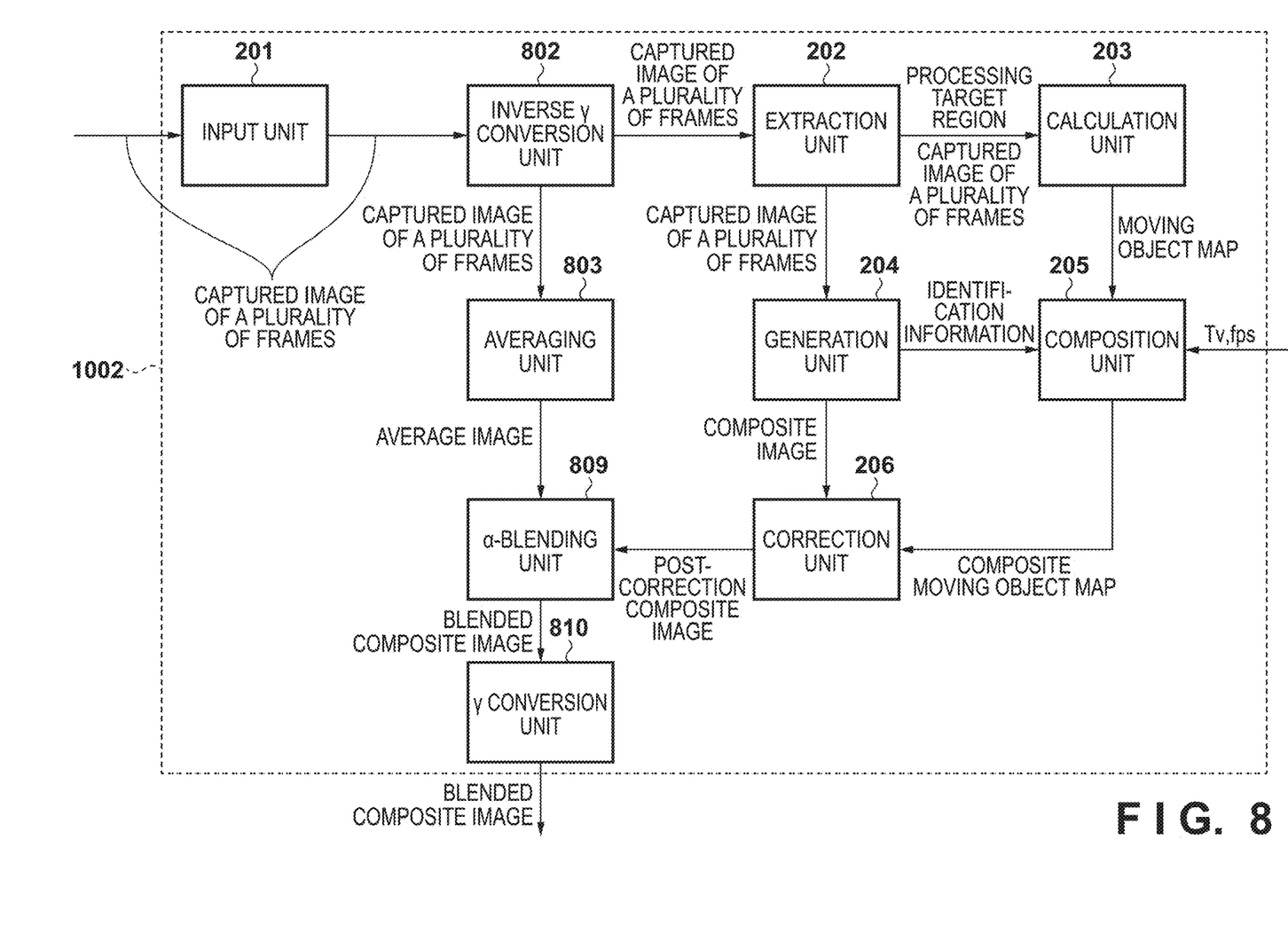
FIG. 8 is a block diagram illustrating an example of a functional configuration of an image processing apparatus.
Figure 9:
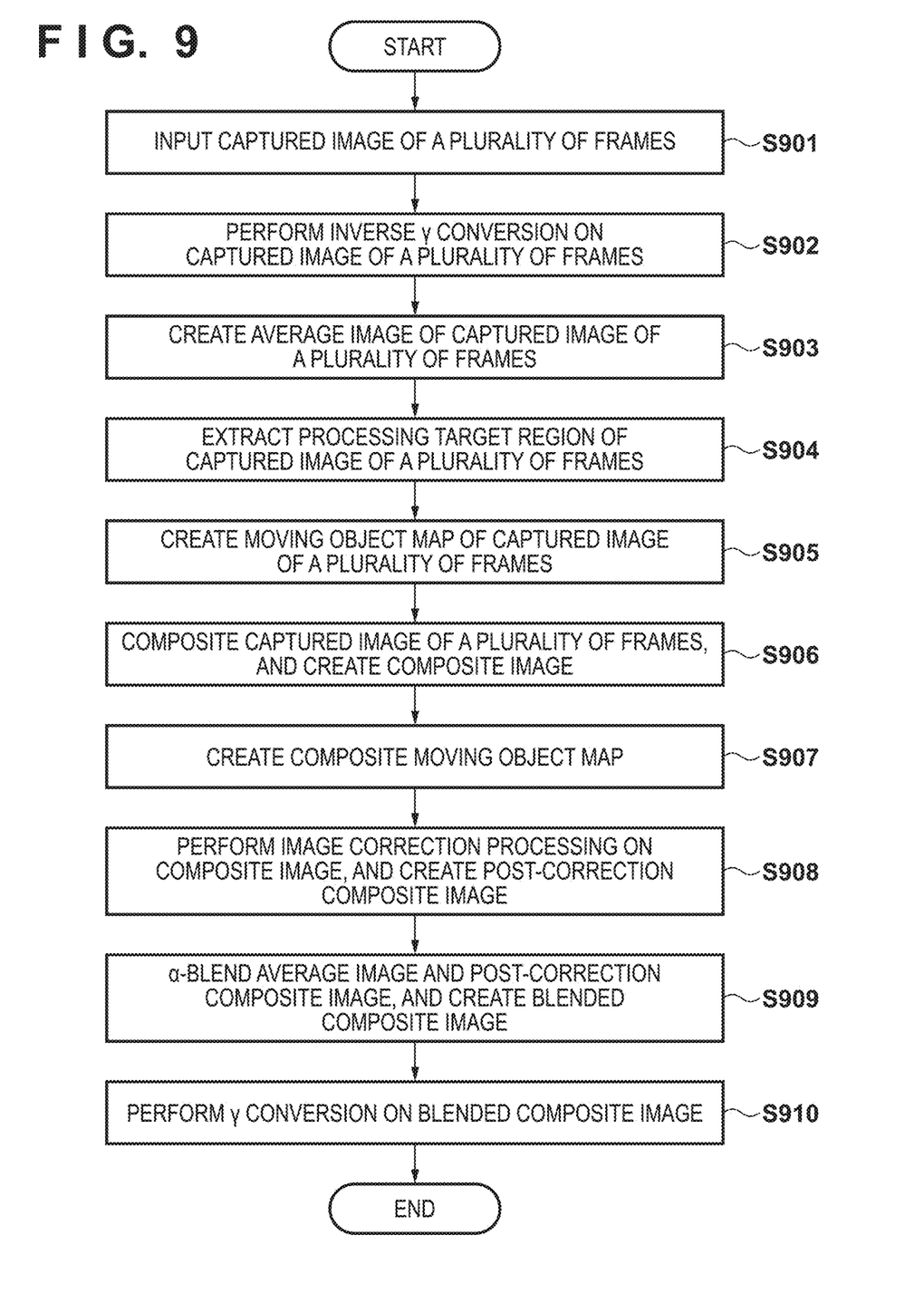
FIG. 9 is a flowchart of a process performed by an image processing apparatus 1002.

An example of a functional configuration of an image processing apparatus according to the present embodiment will be described using a block diagram in FIG. 8. In FIG. 8, the same functional units as those illustrated in FIG. 2 are denoted by the same reference signs, and description according to those functional units will be omitted. The configuration of an image processing apparatus 1002 illustrated in FIG. 8 is a configuration in which an inverse γ conversion unit 802, an averaging unit 803, an α-blending unit 809, and a γ conversion unit 810 are added to the configuration illustrated in FIG. 2. In the present embodiment, mainly, light intensity in a post-correction composite image generated by the processing according to the first embodiment is adjusted by the inverse γ conversion unit 802 and the γ conversion unit 810, and the transparency is adjusted by the α-blending unit 809. A generation process of a post-correction composite image by the image processing apparatus 1002 will be described in accordance with FIG. 9 illustrating a flowchart of the generation process.

Figure 10A:
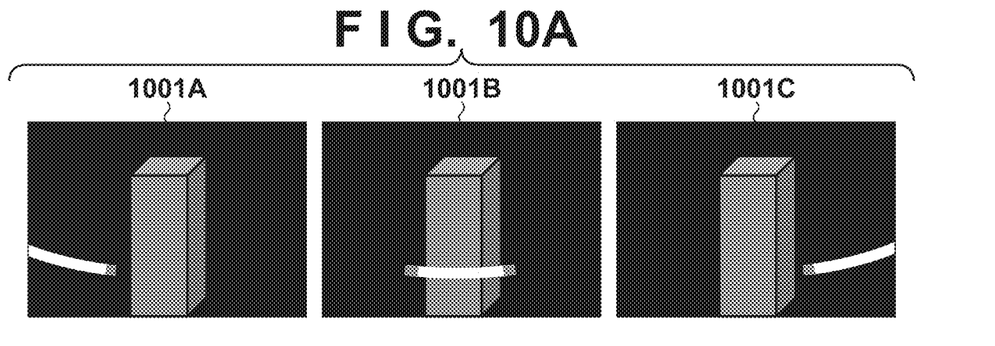
FIGS. 10A to 10D are diagrams illustrating an example of a captured image, a moving object map, a composite image, a composite moving object map, a post-correction composite image, an average image, and a blended composite image.

In step S901, as in step S301 discussed above, the input unit 201 acquires a plurality of captured images obtained by image-capturing the same photographic subject. An example of the captured images acquired in step S901 is illustrated in FIG. 10A. Captured images 1001A, 1001B, and 1001C illustrated in FIG. 10A are an example of consecutive three-frame captured images acquired in step S901. The captured images 1001A, 1001B, and 1001C illustrated in FIG. 10A are consecutive three-frame captured images obtained by image-capturing a photographic subject in such a case where a light source moves in the dark (an example where a structure is present behind the moving light source).

In step S902, the inverse γ conversion unit 802 performs inverse γ conversion on each of the captured images acquired in step S901. The inverse γ conversion may be performed based on a table of RGB pixel values before the conversion and RGB pixel values after the conversion or may be performed based on mathematical formulas.

In step S903, the averaging unit 803 generates an average image of the captured images having experienced the inverse γ conversion. The average image of the plurality of images is generated, for example, by taking an average value of the pixel values at the same pixel position (x, y) in the plurality of images as a pixel value at the pixel position (x, y) in the average image. Note that, 1006 in FIG. 10D is an example of an average image of the captured images 1001A, 1001B, and 1001C. As the number of the "plurality of images" increases, the light trace of a moving portion in the average image becomes thinner to be hardly visible.

The processing in each of steps S904 to S908 is the same as that in each of steps S302 to S306 described above except that the captured images have experienced the inverse γ conversion, and thus description thereof is omitted.

Figure 10B:
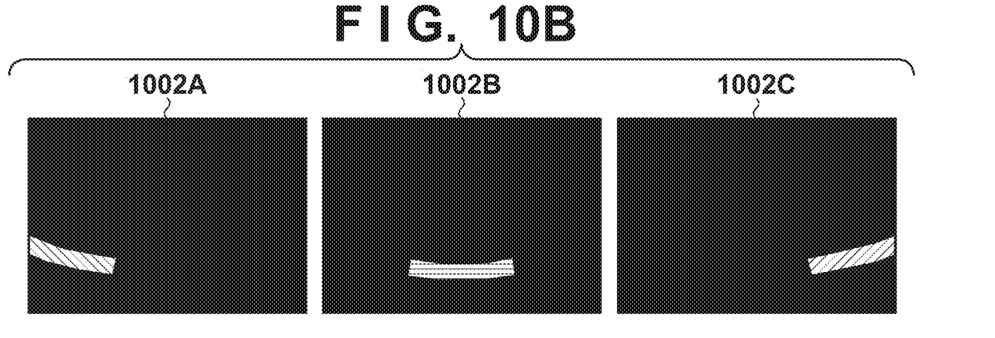
Figure 10C:
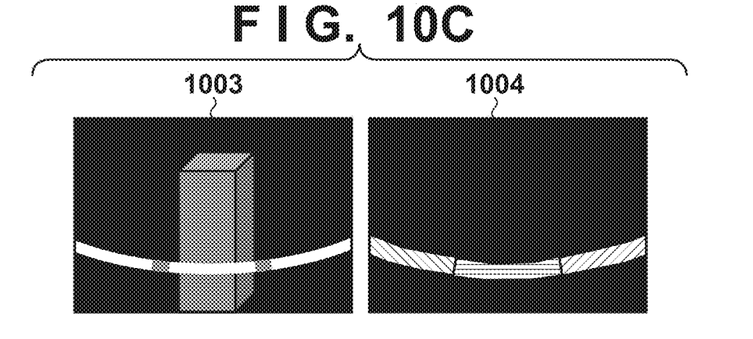
Figure 10D:
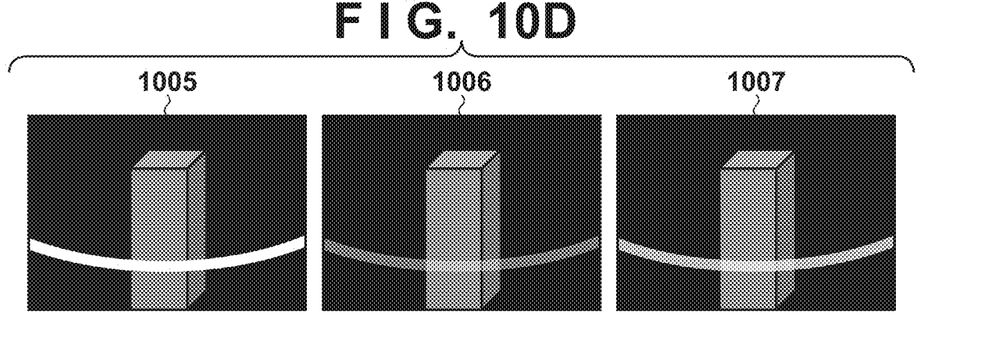

Here, the moving object maps of the captured images 1001A, 1001B, and 1001C are moving object maps 1002A, 1002B, and 1002C in FIG. 10B, respectively. The composite image of the captured images 1001A, 1001B, and 1001C is a composite image 1003 in FIG. 10C, and the composite moving object map of the moving object maps 1002A, 1002B, and 1002C is a composite moving object map 1004 in FIG. 10C. The post-correction composite image of the composite image 1003 is a post-correction composite image 1005 in FIG. 10D. In the post-correction composite image 1005, a discontinued portion in the light trace of the composite image 1003 is connected.

In step S909, the α-blending unit 809 α-blends the average image generated in step S903 and the post-correction composite image generated in step S908 to generate a blended composite image. The α-blend can be represented by a formula of RGBout=(1−α)×RGBave+α×RGBsyn (0≤α≤1), where RGBave is an average image, RGBsyn is a post-correction composite image, and RGBout is a blended composite image. An example of the blended composite image as the result of the α-blend of the average image 1006 and the post-correction composite image 1005 is a blended composite image 1007 in FIG. 10D.

Then, in step S910, the γ conversion unit 810 γ-converts the blended composite image generated in step S909 (inverse conversion of the inverse γ conversion in step S902). The output destination of the γ-converted blended composite image is not limited to any specific output destination, similarly to the first embodiment.

Figure 11:
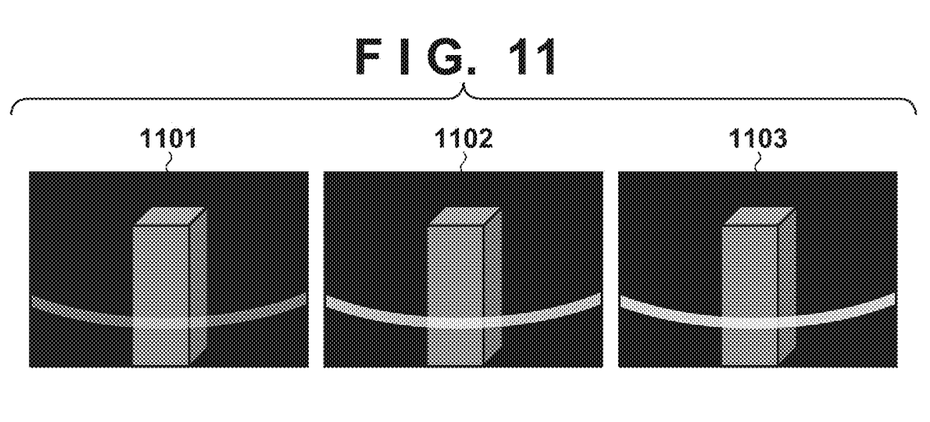
FIG. 11 is a diagram illustrating an example of a blended composite image when an α value is changed.

The intensity and the transparency of the light trace can be adjusted by changing α of the α-blend and the conversion table of inverse γ conversion and γ conversion (or the conversion formula). For example, as the above α value is increased, the blended composite image becomes brighter to be opaque, like 1101, 1102, and 1103 in FIG. 11. Furthermore, when γ is changed, the transparency can be adjusted for each brightness.

Thus, in the present embodiment, the transparency of the trajectory of a moving object in the post-correction composite image can be adjusted by α-blending the average image and the post-correction composite image generated in the first embodiment.

Although, in the present embodiment, the average image refers to an average image of the captured images, Median may be used instead of the average. Furthermore, an average of a portion of the pixel values excluding the values at upper and lower positions (trimmed mean) may be used. The first and second embodiments may also be applied to images in different color spaces, such as images, and may be applied to raw images for each Bayer.

Third Embodiment

The functional units illustrated in FIGS. 2 and 8 may be implemented by hardware or may be implemented by software (computer programs). In the latter case, a computer apparatus having a processor capable of executing the computer programs may be applied to the image processing apparatuses 100 and 1002 described above. An example of a hardware configuration of a computer apparatus 1000 applicable to the image processing apparatuses 100 and 1002 will be described using a block diagram in FIG. 1.

Figure 1:
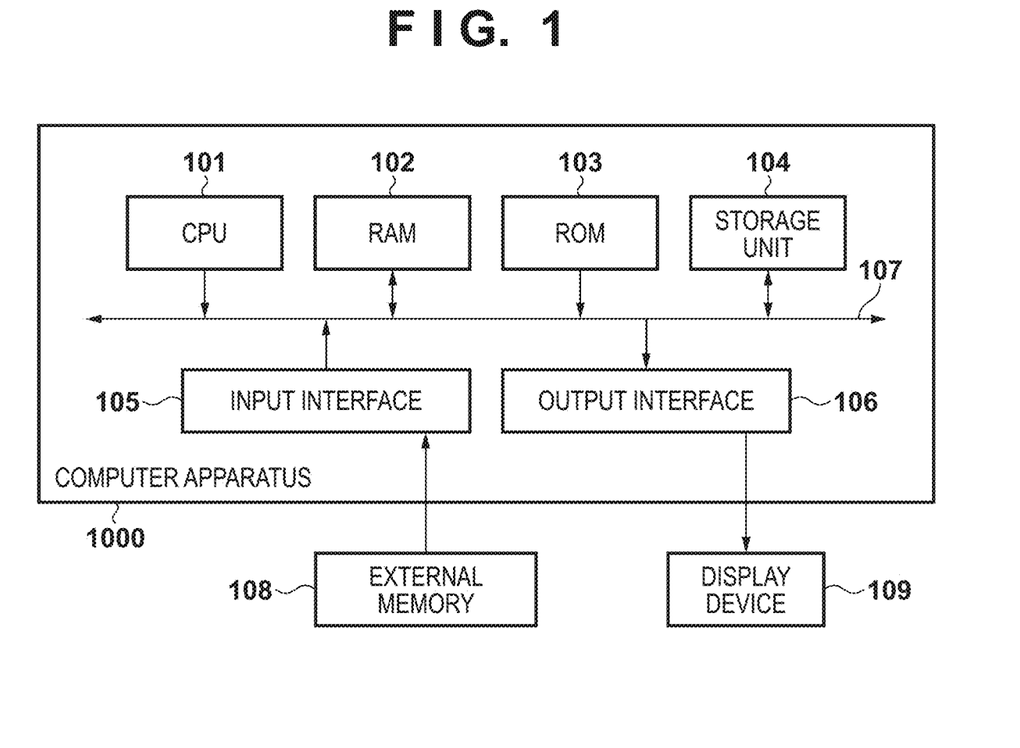
FIG. 1 is a block diagram illustrating an example of a hardware configuration of a computer apparatus 1000.

A CPU 101 executes various processes using computer programs and data stored in a RAM 102, a ROM 103, or the like. With this, the CPU 101 controls the overall operations of the image processing apparatuses 100 and 1002 and performs or controls the processes having been described above such that they are performed by the image processing apparatuses 100 and 1002.

The RAM 102 includes an area for storing computer programs and data loaded from the ROM 103 and a storage unit 104; and an area for storing data received from the exterior via an input interface 105. Additionally, the RAM 102 has a work area which the CPU 101 uses when performing various kinds of processes. As discussed above, the RAM 102 can provide various kinds of areas as appropriate. The ROM 103 stores information that is unnecessary to be rewritten, such as a boot program or setting data of the computer apparatus 1000.

The storage unit 104 is a mass information storage device represented by a hard disk drive device. The storage unit 104 stores an operating system (OS), computer programs, and data for causing the CPU 101 to execute or control the processes having been described above such that they are performed by the image processing apparatuses 100 and 1002; and the like. The computer programs stored in the storage unit 104 include a computer program for causing the CPU 101 to enable the functions of the functional units illustrated in FIGS. 2 and 8. The data stored in the storage unit 104 includes such data that is prepared in advance as explained in the above description. The computer programs and data stored in the storage unit 104 are loaded into the RAM 102 as appropriate in accordance with the control by the CPU 101 and are processed by the CPU 101. In addition to the hard disk drive device, an optical disk drive device, a flash memory, or the like can be applied to the storage unit 104.

The input interface 105 is a serial bus interface such as USB or IEEE 1394. An external memory 108 is connected to the input interface 105, and the CPU 101 reads/writes information from/to the external memory 108 via the input interface 105.

The external memory 108 is a memory device that can be attached to and detached from the computer apparatus 1000, and a hard disk drive device, a memory card, a CF card, an SD card, or a USB memory, for example, can be applied thereto.

The CPU 101 may read out the captured images from the storage unit 104 or the external memory 108 or may acquire, by connecting an image capturing device to the input interface 105, the captured images from the image capturing device via the input interface 105.

An output interface 106 is a video output terminal such as a DVI or HDMI terminal. A display device 109 is connected to the output interface 106. The display device 109 is composed of a liquid crystal screen, a touch panel screen, or the like, and can display the processing results by the CPU 101 with an image, text, or the like.

Any of the CPU 101, RAM 102, ROM 103, storage unit 104, input interface 105, and output interface 106 is connected to a bus 107. Note that the hardware configuration of the computer apparatus applicable to the image processing apparatuses 100 and 1002 is not limited to the configuration illustrated in FIG. 1. For example, an operation unit for inputting various kinds of user operations to the computer apparatus may be provided, or a communication interface may be provided to output the processing results by the computer apparatus to an external device. The image processing apparatuses 100 and 1002 may be a built-in device incorporated into a device such as an image capturing device.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-110507, filed Jun. 8, 2018, which is hereby incorporated by reference herein in its entirety.

What is claimed is:

1. An image processing apparatus, comprising:
a generating unit configured to generate a single composite image by selecting a pixel value for each pixel in any one of a plurality of captured images having been consecutively captured;
a calculating unit configured to calculate a motion vector between at least two captured images among the plurality of captured images; and
a correcting unit configured to perform correction processing, based on a motion vector corresponding to a pixel of interest in the composite image, on the pixel of interest or a pixel near the pixel of interest, wherein
the correcting unit performs the correction processing by updating, using a bright pixel value, a pixel value of at least one pixel in a group of pixels associated with a path from the pixel of interest to a pixel indicated by the motion vector corresponding to the pixel of interest.

2. The image processing apparatus according to claim 1, wherein
the correcting unit performs the correction processing on any one of the pixels included in the group of pixels associated with the path.

3. The image processing apparatus according to claim 1, wherein
the correcting unit updates a pixel value of a correction target pixel to a brighter pixel value.

4. The image processing apparatus according to claim 1, wherein
the correcting unit updates, using a pixel value of any one of the pixels included in the group of pixels associated with the path, a pixel value of the correction processing target pixel.

5. The image processing apparatus according to claim 1, wherein
the correcting unit updates, using a brightest pixel value among the group of pixels associated with the path, a pixel value of the correction processing target pixel.

6. The image processing apparatus according to claim 1, wherein
the correcting unit refers to a motion vector calculated by the calculating unit with respect to a pixel selected by the generating unit as a pixel of interest in the composite image, in order to correct a pixel value of the pixel of interest.

7. The image processing apparatus according to claim 1, wherein
the correcting unit specifies, as a group of pixels associated with the path, pixels through which a line segment passes, the line segment connecting the pixel of interest and a pixel separate from the pixel of interest in a direction of a motion vector corresponding to the pixel of interest.

8. The image processing apparatus according to claim 1, wherein
the correcting unit corrects, based on a pixel value of a pixel in the composite image and a pixel value of a pixel separate from the pixel in a direction of a motion vector corresponding to the pixel, the pixel value of the separate pixel.

9. The image processing apparatus according to claim 1, wherein
the correcting unit weights a pixel value of a pixel separate from the pixel of interest in a direction of a motion vector corresponding to the pixel of interest, in accordance with a distance between the separate pixel and a line segment connecting the pixel of interest and the separate pixel, and then the correcting unit corrects the pixel value of the pixel of interest based on the weighted pixel value.

10. The image processing apparatus according to claim 1, wherein
the generating unit selects a pixel having a maximum luminance value among pixels at a pixel of interest position of the plurality of captured images, and the generating unit selects the selected pixel as a pixel at the pixel of interest position in the composite image.

11. The image processing apparatus according to claim 1, wherein
the generating unit selects a pixel having a minimum luminance value among the pixels at a pixel of interest position of the plurality of captured images, and the generating unit selects the selected pixel as a pixel at the pixel of interest position in the composite image.

12. The image processing apparatus according to claim 1, wherein
the calculating unit calculates a motion vector between the captured image and a captured image having been captured immediately before the captured image.

13. The image processing apparatus according to claim 1, wherein
the calculating unit calculates a motion vector between the captured image and a captured image having been captured immediately after the captured image.

14. The image processing apparatus according to claim 1, wherein
the plurality of captured images is a plurality of frames included in continuous shots or a moving picture, and
the calculating unit corrects a motion vector between the frames based on an exposure time and a frame rate of the captured image.

15. The image processing apparatus according to claim 1, wherein
the generating unit generates a single composite image using a pixel selected from a plurality of captured images that inverse γ conversion has been performed,
the calculating unit calculates a motion vector between at least two captured images among the plurality of captured images that the inverse γ conversion has been performed, and
the correcting unit corrects the composite image based on a motion vector calculated by the calculating unit with respect to a pixel selected by the generating unit as a pixel in the composite image, and the correcting unit performs γ conversion on a result obtained by α-blending the corrected composite image and an average image of the plurality of captured images that the inverse γ conversion has been performed.

16. The image processing apparatus according to claim 1, wherein
in a case where bright pixels are included in the group of pixels associated with the path, the correcting unit performs the correction processing in such a manner as to cause the bright pixels to be continued.

17. The image processing apparatus according to claim 1, wherein
the correcting unit specifies a pixel whose pixel value is to be updated by the correction processing, using a motion vector of the pixel of interest.

18. The image processing apparatus according to claim 1, wherein
the correcting unit determines, using the motion vector, a value from which a pixel value of the correction processing target pixel is updated.

19. An image processing method performed by an image processing apparatus, the method comprising:
generating a single composite image by selecting a pixel value for each pixel in any one of a plurality of captured images having been consecutively captured;
calculating a motion vector between at least two captured images among the plurality of captured images; and
performing correction processing, based on a motion vector corresponding to a pixel of interest in the composite image, on the pixel of interest or a pixel near the pixel of interest, wherein
the correction processing is performed by updating, using a bright pixel value, a pixel value of at least one pixel in a group of pixels associated with a path from the pixel of interest to a pixel indicated by the motion vector corresponding to the pixel of interest.

20. A non-transitory computer-readable storage medium storing a computer program for causing a computer to function as:
a generating unit configured to generate a single composite image by selecting a pixel value for each pixel in any one of a plurality of captured images having been consecutively captured;
a calculating unit configured to calculate a motion vector between at least two captured images among the plurality of captured images; and
a correcting unit configured to perform correction processing, based on a motion vector corresponding to a pixel of interest in the composite image, on the pixel of interest or a pixel near the pixel of interest, wherein
the correcting unit performs the correction processing by updating, using a bright pixel value, a pixel value of at least one pixel in a group of pixels associated with a path from the pixel of interest to a pixel indicated by the motion vector corresponding to the pixel of interest.

* * * * *